United States Patent
Wang et al.

(10) Patent No.: US 7,068,451 B1
(45) Date of Patent: Jun. 27, 2006

(54) DISK DRIVE ESTIMATING A SINUSOIDAL ERROR IN A WEDGE TIME PERIOD DUE TO ECCENTRICITY IN DISK ROTATION

(75) Inventors: Zhi Wang, San Jose, CA (US); Jenghung Chen, Cupertino, CA (US); David Dung Tien Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/989,674

(22) Filed: Nov. 16, 2004

(51) Int. Cl.
*G11B 5/09* (2006.01)
(52) U.S. Cl. ............................. 360/51; 360/25
(58) Field of Classification Search ............ None
See application file for complete search history.

(56) References Cited

U.S. PATENT DOCUMENTS

| | | | | |
|---|---|---|---|---|
| 5,297,131 | A * | 3/1994 | Tanaka | 369/275.2 |
| 5,761,165 | A * | 6/1998 | Takeda et al. | 360/51 |
| 5,905,705 | A * | 5/1999 | Takeda et al. | 360/51 |
| 6,067,202 | A | 5/2000 | Rowan et al. | |
| 6,285,622 | B1 * | 9/2001 | Haraguchi et al. | 365/226 |
| 6,381,292 | B1 * | 4/2002 | Yamakoshi | 375/376 |
| 6,498,698 | B1 * | 12/2002 | Golowka et al. | 360/78.12 |
| 6,710,957 | B1 * | 3/2004 | Nakasato | 360/51 |
| 6,754,025 | B1 | 6/2004 | Shepherd et al. | |
| 6,882,487 | B1 * | 4/2005 | Hanson et al. | 360/51 |
| 6,882,609 | B1 | 4/2005 | Williams et al. | |
| 6,954,324 | B1 * | 10/2005 | Tu et al. | 360/73.03 |
| 6,972,540 | B1 * | 12/2005 | Wang et al. | 318/650 |
| 2001/0013989 | A1 * | 8/2001 | Saiki et al. | 360/78.04 |
| 2002/0078413 | A1 * | 6/2002 | Haines et al. | 714/748 |
| 2002/0084760 | A1 * | 7/2002 | Messenger et al. | 318/439 |
| 2003/0184906 | A1 * | 10/2003 | Hanson et al. | 360/73.03 |
| 2004/0245950 | A1 * | 12/2004 | Ang et al. | 318/268 |
| 2005/0105205 | A1 * | 5/2005 | Suzuki | 360/75 |

OTHER PUBLICATIONS

A. Sacks, M. Bodson, W. Messner, "Advanced Methods for Repeatable Runout Compensation", IEEE Transactions on Magnetics, vol. 31, No. 2, Mar. 1995.

* cited by examiner

*Primary Examiner*—Wayne Young
*Assistant Examiner*—Dismery Mercedes
(74) *Attorney, Agent, or Firm*—Howard H. Sheerin, Esq.

(57) ABSTRACT

A disk drive and method for estimating a sinusoidal error in a wedge time period is disclosed. An estimated WTP is calculated according to:

$$\text{EST\_WTP} = \text{RTP} + \hat{a}*\cos(2\pi k/N) + \hat{b}*\sin(2\pi k/N)$$

wherein RTP is a reference time period corresponding to a nominal WTP, k is an index representing a servo wedge, and $\{\hat{a},\hat{b}\}$ are adjustable coefficients. A wedge time error e(k) is estimated as the difference between the estimated WTP and a detected actual WTP. The coefficients $\{\hat{a},\hat{b}\}$ for generating the estimated WTP are adjusted according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain.

6 Claims, 8 Drawing Sheets

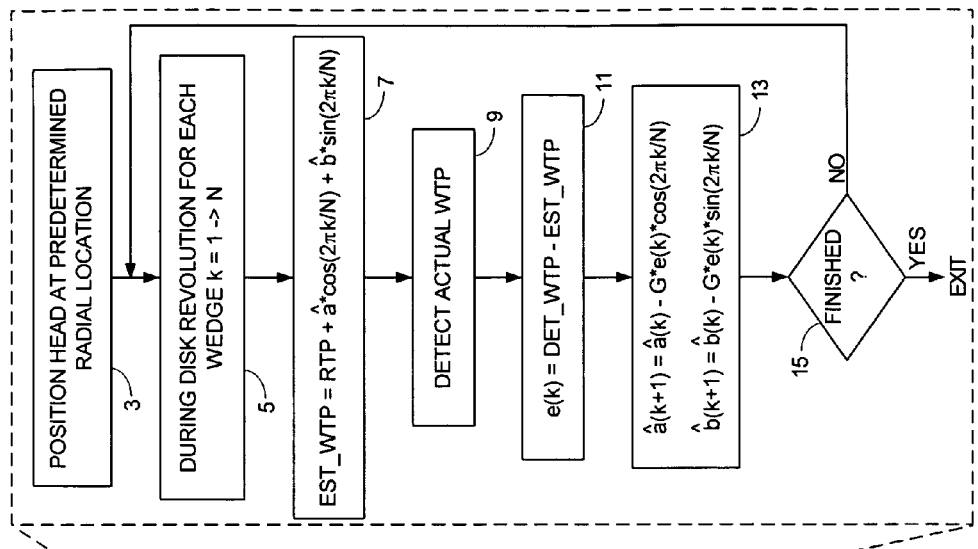
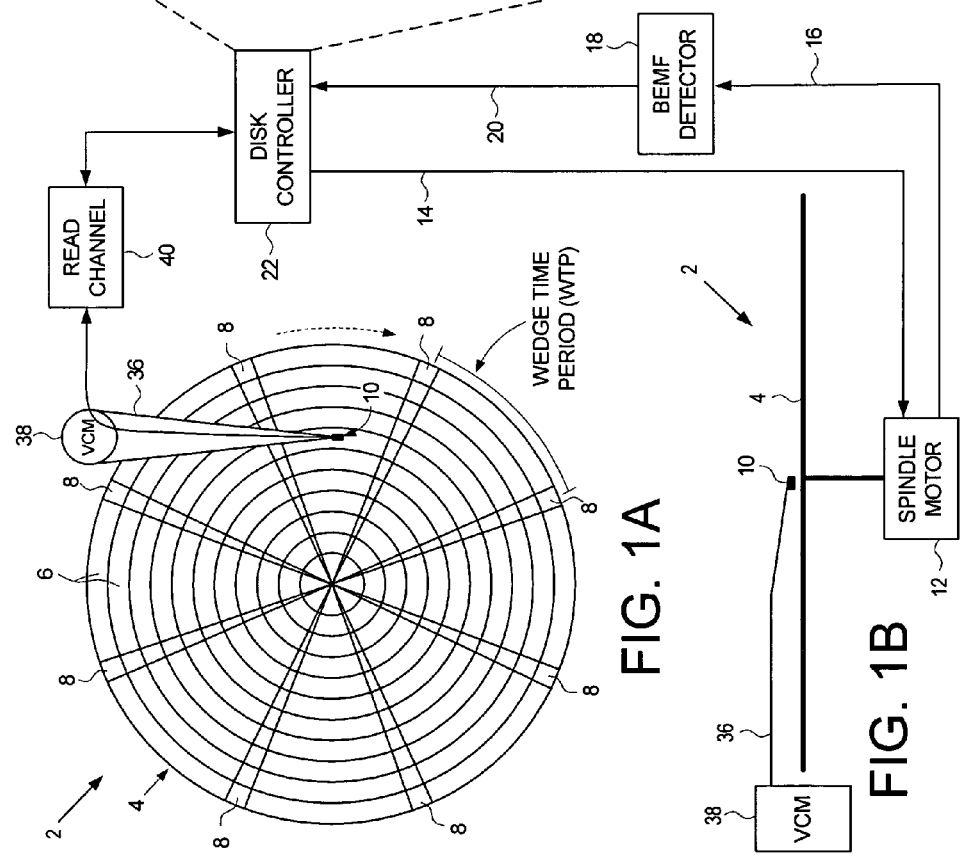
FIG. 2
FIG. 1A
FIG. 1B

DISK DRIVE ESTIMATING A SINUSOIDAL ERROR IN A WEDGE TIME PERIOD DUE TO ECCENTRICITY IN DISK ROTATION

BACKGROUND OF THE INVENTION

1. Field of the Invention

The present invention relates to disk drives. In particular, the present invention relates to a disk drive estimating a sinusoidal error in a wedge time period due to eccentricity in disk rotation.

2. Description of the Prior Art

A disk drive typically comprises one or more disks rotated by a spindle motor while heads are actuated radially over the disk surfaces. Each disk surface comprises a number of radially spaced, concentric tracks, where each track is divided into a number of data sectors. A number of embedded servo sectors forming servo wedges are also written on each disk surface, which facilitate seeking the head and maintaining the head over the centerline of a target track during read and write operations. The disks are rotated at a constant angular velocity (CAV) while varying the data rate from an inner diameter zone to an outer diameter zone to maximize the recording density.

Each servo sector comprises a sync mark for synchronizing to servo data recorded in the servo sector, such as a Gray coded track address. A sync mark detection window is opened when the head reaches the expected circumferential location for a servo sync mark as determined from a wedge period counter clocked at a predetermined frequency. Since the disk is rotated at a constant angular velocity, the sync mark detection window should be opened at a constant wedge time period (WTP). However, eccentricities in the disk rotating will introduce a sinusoidal disturbance in the WTP. Eccentricities may occur, for example, if a media writer is used to servo write the disk before installing the disk into the disk drive, if the disk "slips" after using the head internal to the disk drive to servo write the disk, or if the disk slips after writing user data to the data sectors.

U.S. Patent Application No. 2003/0184906 suggests a technique for estimating the sinusoidal disturbance in the WTP by computing a single-point Discrete Fourier Transform (DFT) to generate eccentricity compensation values used to adjust the sync mark detection window. However, using a single-point DFT to estimate the sinusoidal disturbance may require a significant number of revolutions in order to generate an accurate estimate depending on the magnitude and character of the signal noise. This estimation delay is compounded due to the sinusoidal disturbance varying over the radius of the disk requiring the estimation technique be repeated at multiple radial locations.

There is, therefore, a need to improve the technique for estimating the sinusoidal disturbance in the WTP due to eccentricities in the rotation of the disk.

SUMMARY OF THE INVENTION

The present invention may be regarded as a disk drive comprising a disk having a plurality of tracks, wherein each track comprises a plurality of data sectors and a plurality of servo sectors forming N servo wedges, and a wedge time period (WTP) occurs between each servo wedge. A head is actuated over the disk, and a disk controller estimates a sinusoidal error in the WTP due to eccentricity in the disk rotating. The head is positioned over a selected one of the tracks, and an estimated WTP is calculated according to:

$$\text{EST\_WTP} = \text{RTP} + \hat{a}*\cos(2\pi k/N) + \hat{b}*\sin(2\pi k/N)$$

wherein RTP is a reference time period corresponding to a nominal WTP, k is an index representing one of the servo wedges, and $\{\hat{a},\hat{b}\}$ are adjustable coefficients. An actual WTP is detected by detecting an interval between the head passing over a first and second servo wedge, and a wedge time error e(k) is estimated as the difference between the estimated WTP and the detected actual WTP. The coefficients $\{\hat{a},\hat{b}\}$ for generating the estimated WTP are adjusted according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain. The above steps of calculating an estimated WTP, detecting an actual WTP, estimating a wedge time error e(k), and adjusting the coefficients $\{\hat{a},\hat{b}\}$ are repeated at least once, for example, until the wedge time error e(k) falls below a predetermined threshold.

In another embodiment, each servo sector comprises a servo sync mark, a wedge period counter is controlled in response to the coefficients $\{\hat{a},\hat{b}\}$, and a sync mark detection window is opened in response to the wedge period counter indicating the head is approaching a servo sync mark in a servo sector.

The present invention may also be regarded as a method of estimating a sinusoidal error in a wedge time period (WTP) in a disk drive due to eccentricity in a disk rotating. The disk drive comprises the disk having a plurality of tracks, wherein each track comprises a plurality of data sectors and a plurality of servo sectors forming N servo wedges, wherein the WTP occurs between each servo wedge. The disk drive further comprising a head actuated over the disk. The head is positioned over a selected one of the tracks, and an estimated WTP is calculated according to:

$$\text{EST\_WTP} = \text{RTP} + \hat{a}*\cos(2\pi k/N) + \hat{b}*\sin(2\pi k/N)$$

wherein RTP is a reference time period corresponding to a nominal WTP, k is an index representing one of the servo wedges, and $\{\hat{a},\hat{b}\}$ are adjustable coefficients. An actual WTP is detected by detecting an interval between the head passing over a first and second servo wedge, and a wedge time error e(k) is estimated as the difference between the estimated WTP and the detected actual WTP. The coefficients $\{\hat{a},\hat{b}\}$ for generating the estimated WTP are adjusted according to:

$$\hat{a}(k+1) = \hat{a}(k) - G*e(k)*\cos(2k/N)$$

$$\hat{b}(k+1) = \hat{b}(k) - G*e(k)*\sin(2\pi k/N)$$

wherein G is a predetermined gain. The above steps of calculating an estimated WTP, detecting an actual WTP, estimating a wedge time error e(k), and adjusting the coefficients $\{\hat{a},\hat{b}\}$ are repeated at least once, for example, until the wedge time error e(k) falls below a predetermined threshold.

BRIEF DESCRIPTION OF THE DRAWINGS

FIGS. 1A–1B show a disk drive according to an embodiment of the present invention comprising a disk having a plurality of servo wedges, a head actuated over the disk, and a disk controller for estimating a sinusoidal error in a wedge time period (WTP).

FIG. 2 is a flow diagram according to an embodiment of the present invention for estimating the sinusoidal error in the WTP by estimating coefficients of the sinusoid using closed-loop feedback.

DESCRIPTION OF THE PREFERRED EMBODIMENTS

Figure 3A:
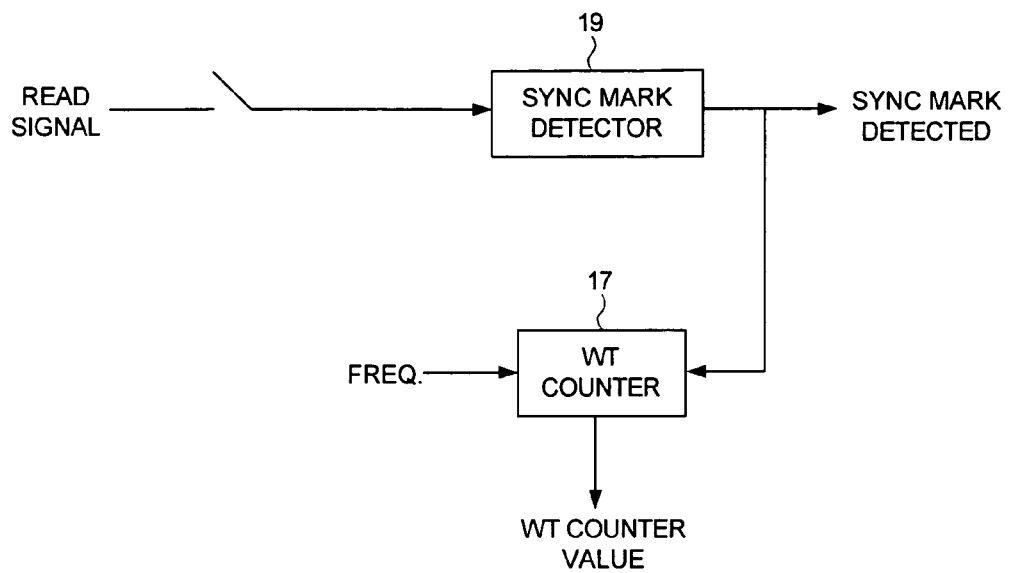
FIG. 3A shows an embodiment of the present invention wherein a wedge time counter is used to detect an actual WTP.

FIGS. 1A–1B show a disk drive 2 according to an embodiment of the present invention comprising a disk 4 having a plurality of tracks 6, wherein each track comprises a plurality of data sectors and a plurality of servo sectors forming N servo wedges 8, and a wedge time period (WTP) occurs between each servo wedge 8. A head 10 is actuated over the disk 4, and a disk controller 22 executes the flow diagram of FIG. 2 to estimate a sinusoidal error in the WTP due to eccentricity in the disk 4 rotating. At step 3 the head 10 is positioned over a selected one of the tracks 6, and during each revolution of the disk 4 (step 5) an estimated WTP is calculated at step 7 according to:

$$EST\_WTP = RTP + \hat{a}*\cos(2\pi k/N) + *\sin(2\pi k/N)$$

wherein RTP is a reference time period corresponding to a nominal WTP, k is an index representing one of the servo wedges, and $\{\hat{a}, \hat{b}\}$ are adjustable coefficients. At step 9 an actual WTP is detected by detecting an interval between the head 10 passing over a first and second servo wedge 8. At step 11 a wedge time error e(k) is estimated as the difference between the estimated WTP and the detected actual WTP. At step 13 the coefficients $\{\hat{a}, \hat{b}\}$ for generating the estimated WTP are adjusted according to:

$$\hat{a}(k+1) = \hat{a}(k) - G*e(k)*\cos(2\pi k/N)$$

$$\hat{b}(k+1) = \hat{b}(k) - G*e(k)*\sin(2\pi k/N)$$

wherein G is a predetermined gain. At step 15 the above steps of calculating an estimated WTP, detecting an actual WTP, estimating a wedge time error e(k), and adjusting the coefficients $\{\hat{a}, \hat{b}\}$ are repeated at least once, for example, until the wedge time error e(k) falls below a predetermined threshold.

Because the present invention uses closed-loop feedback, the above equation will converge to an accurate estimate of the coefficients $\{\hat{a}, \hat{b}\}$ within fewer revolutions of the disk as compared to the prior art technique of computing a single-point DFT. In one embodiment, the number of iterations to compute the coefficients using the above equation is determined based on a fixed number of disk revolutions. In an alternative embodiment, the iterations are terminated once the wedge time error e(k) falls below a predetermined threshold thereby minimizing the number of disk revolutions.

In one embodiment, the flow diagram of FIG. 2 is executed over a number of different radial locations (different tracks 6) to account for the change in the sinusoidal error relative to the radial location of the head 10. For example, in one embodiment the disk drive is partitioned into a number of zones wherein each zone comprises a predetermined band of tracks. The flow diagram is executed for a selected track in each zone (e.g., the middle track) and the resulting coefficients $\{\hat{a}, \hat{b}\}$ used for each track in the zone. A suitable interpolation technique may also be employed to calculate the coefficients $\{\hat{a}, \hat{b}\}$ based on the radial location (track number), for example, using a suitable curve fitting polynomial.

Any suitable circuitry may be employed to detect the actual WTP at step 9 of FIG. 2. FIG. 3A shows an embodiment of the present invention wherein a wedge time counter 17 is clocked at a predetermined frequency. When a sync mark detector 19 detects a sync mark in the servo wedge 8, the value of the wedge time counter 17 is latched as a servo time stamp. The actual WTP detected at step 9 of FIG. 2 is then computed as the difference between consecutive servo time stamps (wedge time counter values).

Figure 3B:
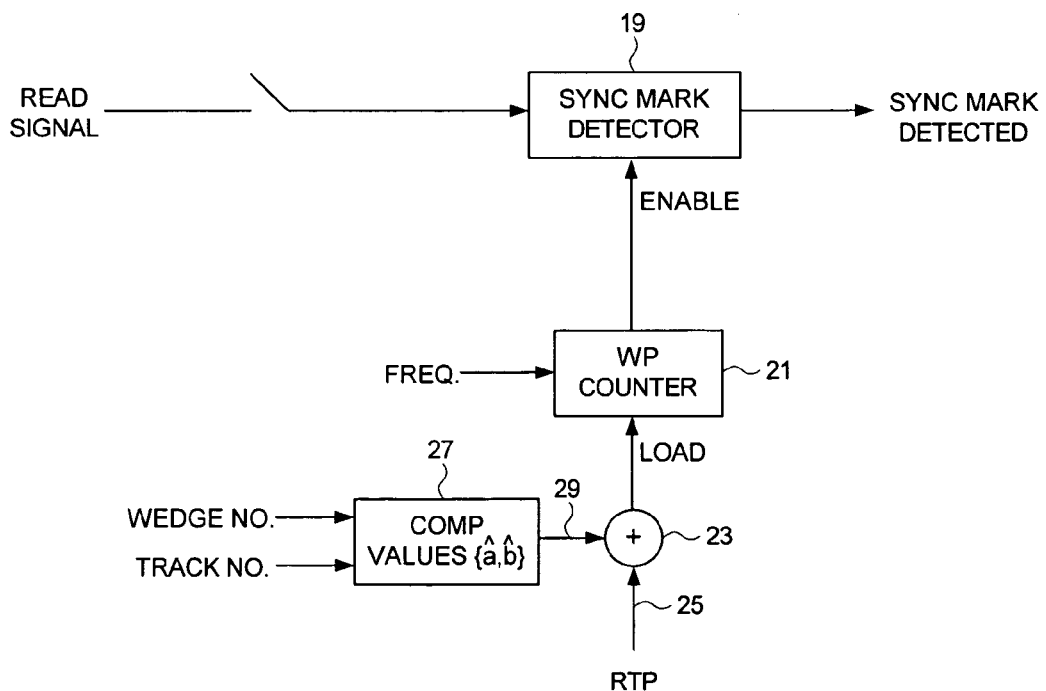
FIG. 3B shows an embodiment of the present invention wherein a wedge period counter is loaded with a nominal value adjusted by an eccentricity compensation value computed using the coefficients of the sinusoidal error in the WTP.

The coefficients $\{\hat{a}, \hat{b}\}$ may be used in any suitable manner to enhance the operation of the disk drive 2. In an embodiment shown in FIG. 3B, the coefficients $\{\hat{a}, \hat{b}\}$ are used to enable the sync mark detector 19 at the appropriate time by opening a sync mark detection window commensurate with the head 10 approaching a servo sync mark. A wedge period counter 21 is loaded with a count value corresponding to the estimated WTP for the current servo wedge. The count value is computed by adding 23 the RTP 25 to an eccentricity compensation value 29 computed 27 using the coefficients $\{\hat{a}, \hat{b}\}$ as a function of the wedge number and track number. The eccentricity compensation values 29 may be computed 27 using any suitable technique such as a lookup table or curve fitting polynomial. The RTP 25 may also be generated using any suitable technique, such as computing the average WTP over a revolution of the disk during a calibration mode. After loading the wedge period counter 21 with the estimated WTP value, the wedge period counter 21 is decremented at a predetermined frequency and then opens the sync mark detection window when the wedge period counter 21 underflows.

Figure 4:
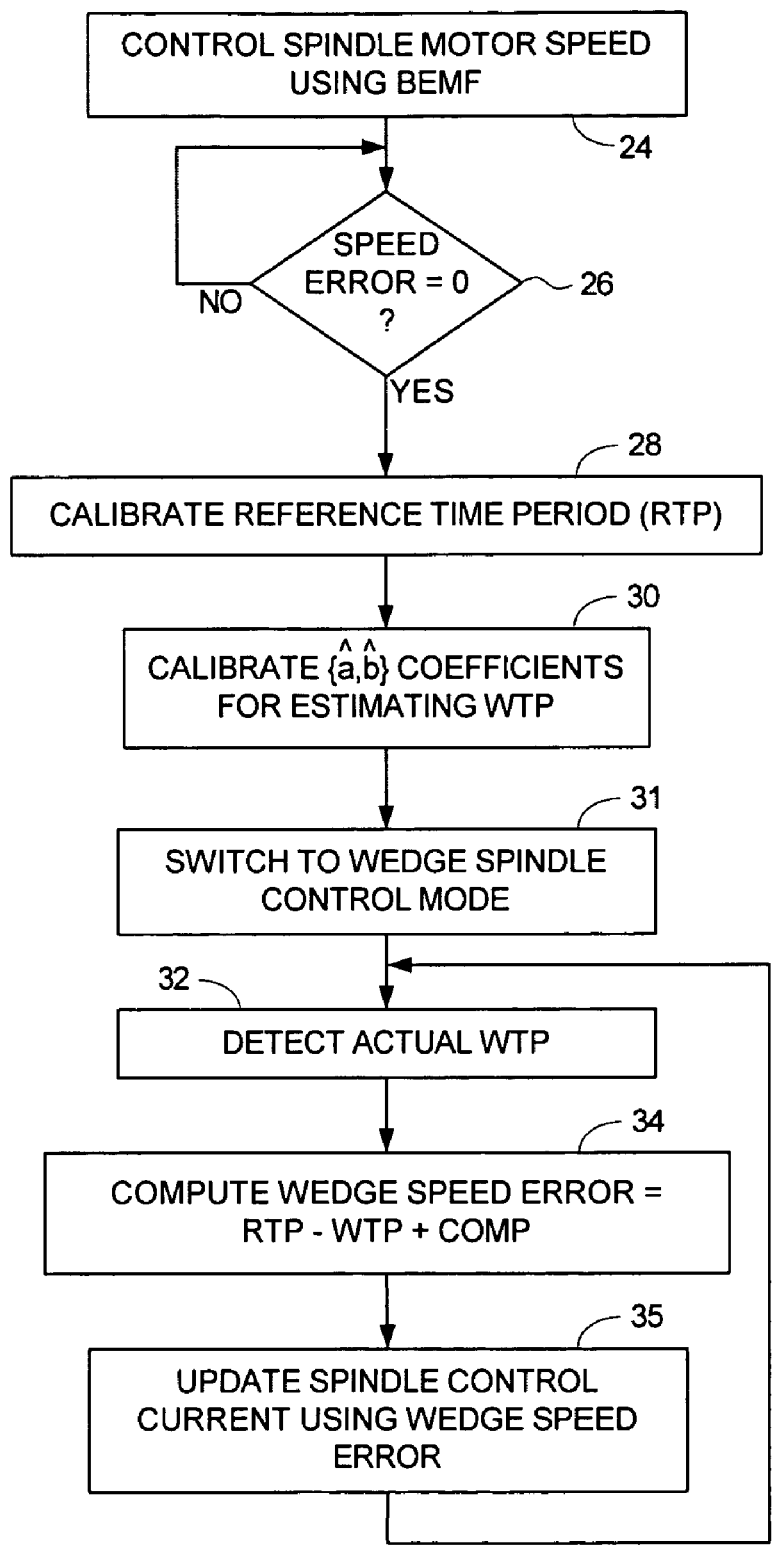
FIG. 4 is a flow diagram according to an embodiment of the present invention for using a compensated WTP for controlling the speed of a spindle motor.

In another embodiment of the present invention, the coefficients {â,b̂} are used to estimate the WTP for use in controlling the speed of a spindle motor 12 shown in FIG. 1B. The spindle motor 12 rotates the disk 4 at an operating speed in response to a spindle control current 14, wherein the spindle motor 12 comprises a plurality of windings which generate a back electromotive force (BEMF) voltage 16. A BEMF detector 18 generates a BEMF signal 20 by comparing the BEMF voltage 16 to a threshold. The disk controller 22 executes the steps of the flow diagram shown in FIG. 4 to control the spindle motor 12 by generating the spindle control current 14 during a BEMF spindle speed control mode or a wedge spindle speed control mode. At step 24, a BEMF speed error is generated in response to the BEMF signal 20 during the BEMF spindle speed control mode, and the spindle control current 14 is updated in response to the BEMF speed error to drive the disk 4 at the operating speed. If at step 26 the BEMF speed error is substantially zero, at step 28 a reference time period is calibrated by accumulating a predetermined number of WTPs. At step 30 the coefficients {â,b̂} for generating the estimated WTPs are computed by executing the flow diagram of FIG. 2, and in one embodiment, over a number of different radial locations of the disk 4. At step 31, the disk controller 22 switches to the wedge spindle speed control mode. At step 32 an actual WTP is detected, and at step 34 a wedge speed error is generated representing a difference between the RTP and the detected actual WTP adjusted by an eccentricity compensation value computed from the coefficients {â,b̂}. Similar to the eccentricity compensation values 29 of FIG. 3B, in one embodiment the eccentricity compensation values computed at step 34 of FIG. 4 are computed as a function of the current wedge number and track number. At step 35 the disk 4 is maintained at the operating speed by updating the spindle control current 14 in response to the wedge speed error.

In the embodiment of FIGS. 1A and 1B, the head 10 is connected to a distal end of an actuator arm 36 which is rotated about a pivot by a voice coil motor (VCM) 38 in order to actuate the head 10 radially over the disk 4. A read channel 40 processes the read signal emanating from the head 10 and detects an estimated binary sequence representing the data recorded on the disk 4. The read channel 40 also detects the sync marks in the servo wedges 8 used to update the wedge time counter 17 of FIG. 3A. The read channel 40 may be implemented as a separate integrated circuit, or integrated with the disk controller 22 in a "system on a chip". Similarly, the BEMF detector 18 may be integrated into the disk controller 22 or implemented in a separate servo controller chip.

Figure 5:
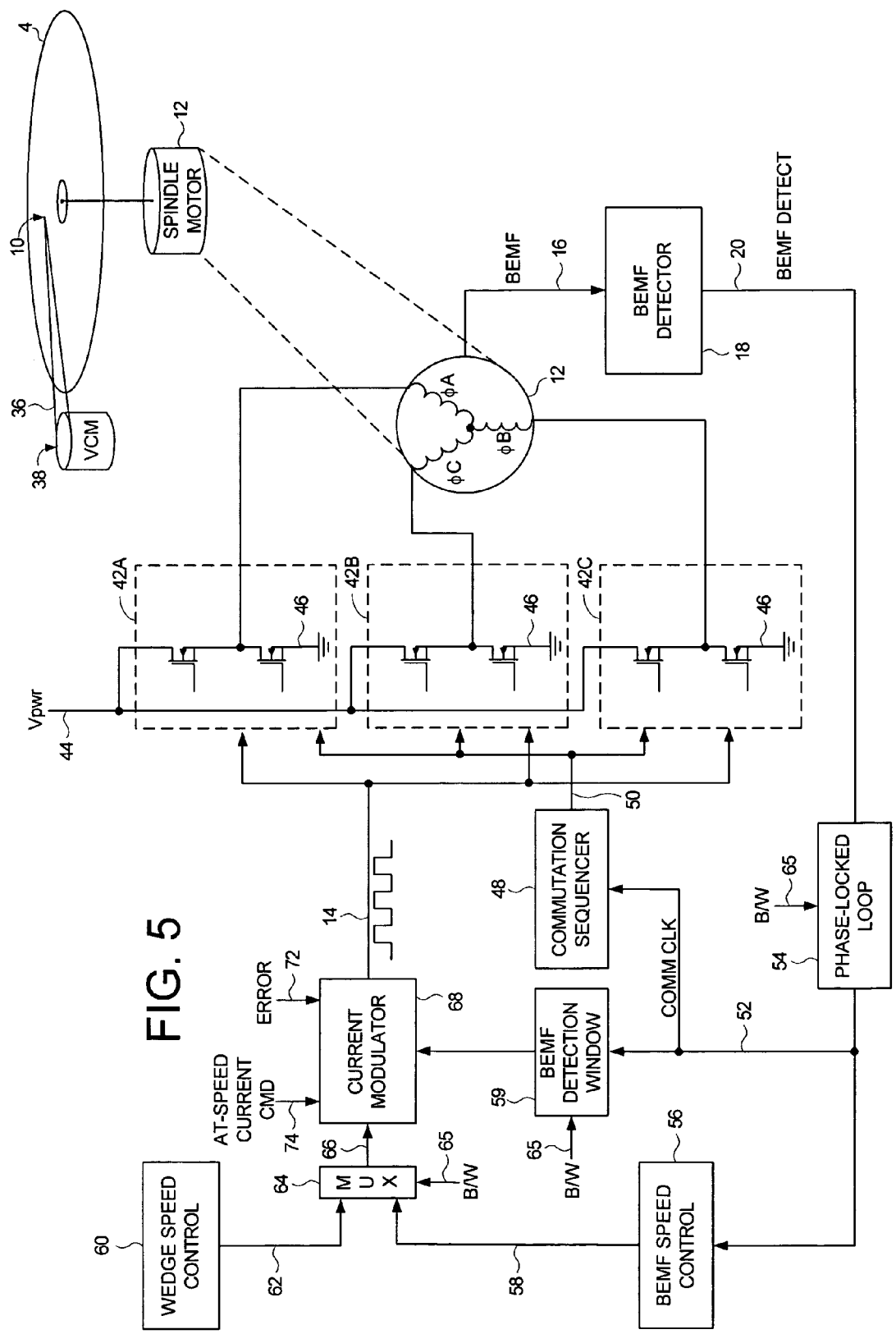
FIG. 5 shows further details of the spindle control circuitry according to an embodiment of the present invention including a BEMF detector, a phased-locked-loop, BEMF detection window circuitry, a commutation sequencer, and a current modulator for generating a PWM current control signal.

FIG. 5 shows a spindle motor 12 according to an embodiment of the present invention comprising three windings connected at a center tap forming three phases (φA, φB, φC); however, any suitable spindle motor comprising any suitable number of windings in any suitable configuration implementing any suitable number of phases may be employed. FIG. 5 also shows details of spindle driver circuitry comprising three sets of commutation switches 42A–42C each comprising a first field effect transistor (FET) for connecting a respective winding to a power supply Vpwr 44 and a second FET for connecting the respective winding to ground 46. A commutation sequencer 48 generates a control signal 50 applied to the commutation switches 42A–42C in order to drive current from the power supply 44 through the appropriate windings to ground 46 as determined from the commutation state. The commutation sequencer 48 may control the commutation switches 42A–42C in any suitable manner, such as in a conventional bipolar commutation sequence, tripolar commutation sequence, or hybrid bipolar-tripolar commutation sequence as disclosed in U.S. Pat. No. 5,808,440, the disclosure of which is incorporated herein by reference.

Figure 6:
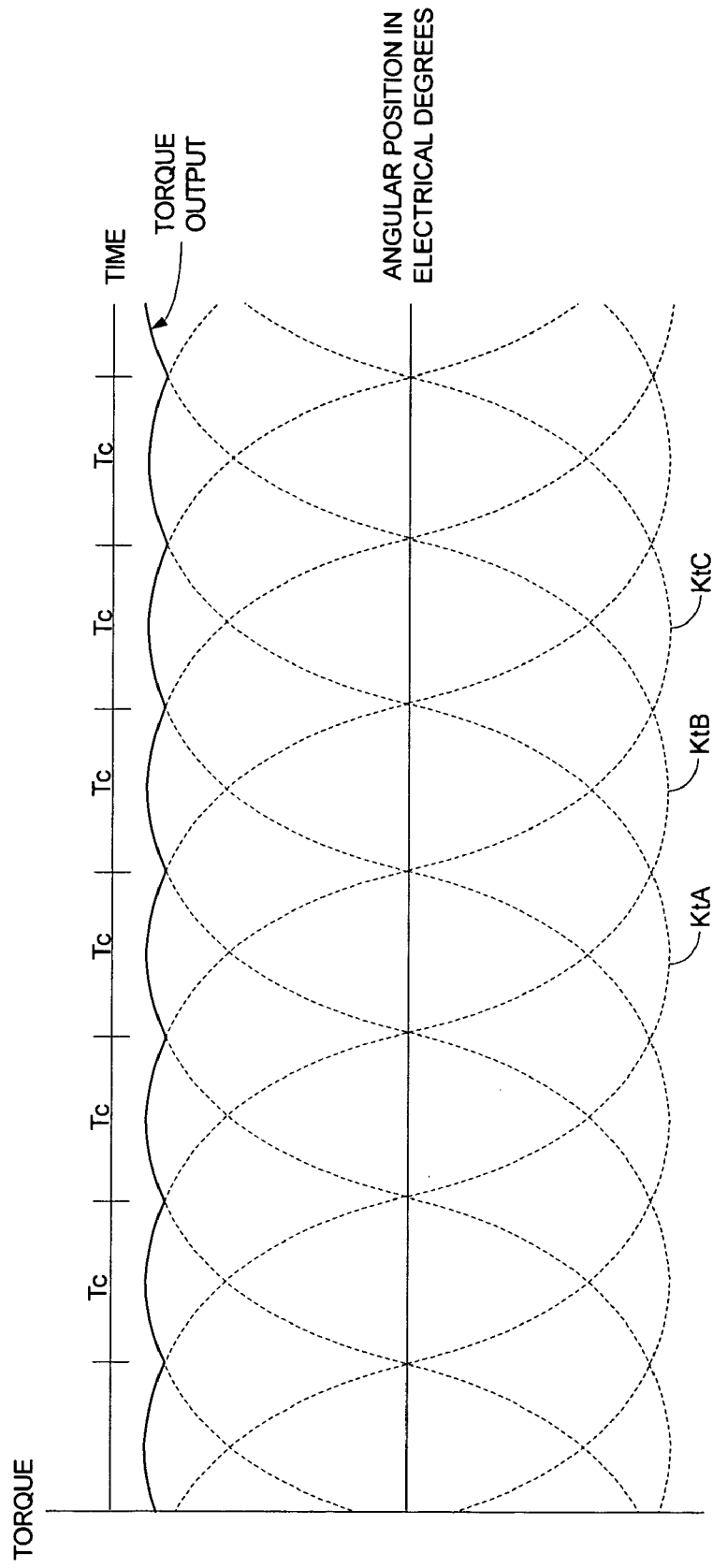
FIG. 6 is a waveform showing the torque curves generated by the windings of a three-phase spindle motor and an associated commutation interval.

The amount of torque generated by the spindle motor 12 is determined by the angular position of the rotor with respect to the stator, the magnitude of the current driving the windings, and a torque constant Kt. The torque constant Kt is a function of the number of turns in the windings as well as the strength of the permanent magnets. FIG. 6 illustrates the torque curves for the three-phase spindle motor 12 of FIG. 5, where the three dashed-line sine waves KtA, KtB, and KtC correspond to the torque profile for each phase of the spindle motor. The desired torque output (shown as a solid line) is generated by changing the commutation state at the appropriate commutation interval Tc.

The appropriate commutation interval can be determined by detecting zero crossings in the BEMF voltage 16 generated by the un-energized winding. In FIG. 5, a commutation clock 52 is generated by a phase-locked-loop (PLL) 54 which locks onto the frequency of the BEMF zero crossings signal 20. The commutation clock 52 is applied to the commutation sequencer 48 and a BEMF speed control block 56. The BEMF speed control block 56 computes the BEMF speed error as the difference between an actual and desired frequency of the BEMF zero crossings signal 20, and implements a compensator for generating a BEMF spindle control current command 58 in response to the BEMF speed error. A current modulator 68 adjusts a duty cycle of a PWM signal 14 (spindle control current 14 in FIG. 1A) in response to the BEMF spindle control current command 58 which controls the amount of current flowing through the energized windings, and therefore the amount of torque output and speed of the spindle motor 12. BEMF detection window circuitry 59 periodically disables the PWM signal 14 (e.g., holds the PWM signal 14 high) for a predetermined interval (detection window) to attenuate noise in the BEMF voltage 16 while the BEMF detector 18 compares the BEMF voltage 16 to the threshold. In the embodiment of FIG. 5, the timing of the BEMF detection window is determined from the commutation clock 52.

A wedge speed control block 60 generates the wedge speed error in response to the servo wedges 8, the reference time period (RTP), and the eccentricity compensation values. The wedge speed control block 60 implements a compensator for generating a wedge spindle control current command 62 in response to the wedge speed error. In one embodiment, the compensator implemented in the wedge speed control block 60 has a higher bandwidth than the compensator implemented by the BEMF speed control block 56.

A multiplexer 64 controlled by signal B/W 65 selects between the BEMF spindle control current command 58 and the wedge spindle control current command 62 as the control current command 66 applied to the current modulator 68. During an error condition 72, the current modulator 68 fixes the duty cycle of the PWM signal 14 in response to an at-speed current command 74 so that the at-speed current is applied to the windings.

In one embodiment, the B/W signal 65 also disables the BEMF detection window circuitry 59 while the speed of the spindle motor 12 is controlled in response to the wedge speed error. This embodiment helps reduce acoustic noise caused by current transients that occur when the PWM signal 14 is disabled (e.g., held high) during the detection window. In one embodiment while the BEMF detection window circuitry 59 disabled, the B/W signal 65 configures the PLL 54 to output a fixed frequency commutation clock 52 corresponding to the at-speed frequency. In an alternative embodiment, the PLL 54 continues to generate the commutation clock 52 in response to the BEMF signal 20 even though it may be less reliable due to the noise induced into the BEMF voltage 16 by the switching action of the PWM signal 14.

Figure 7:
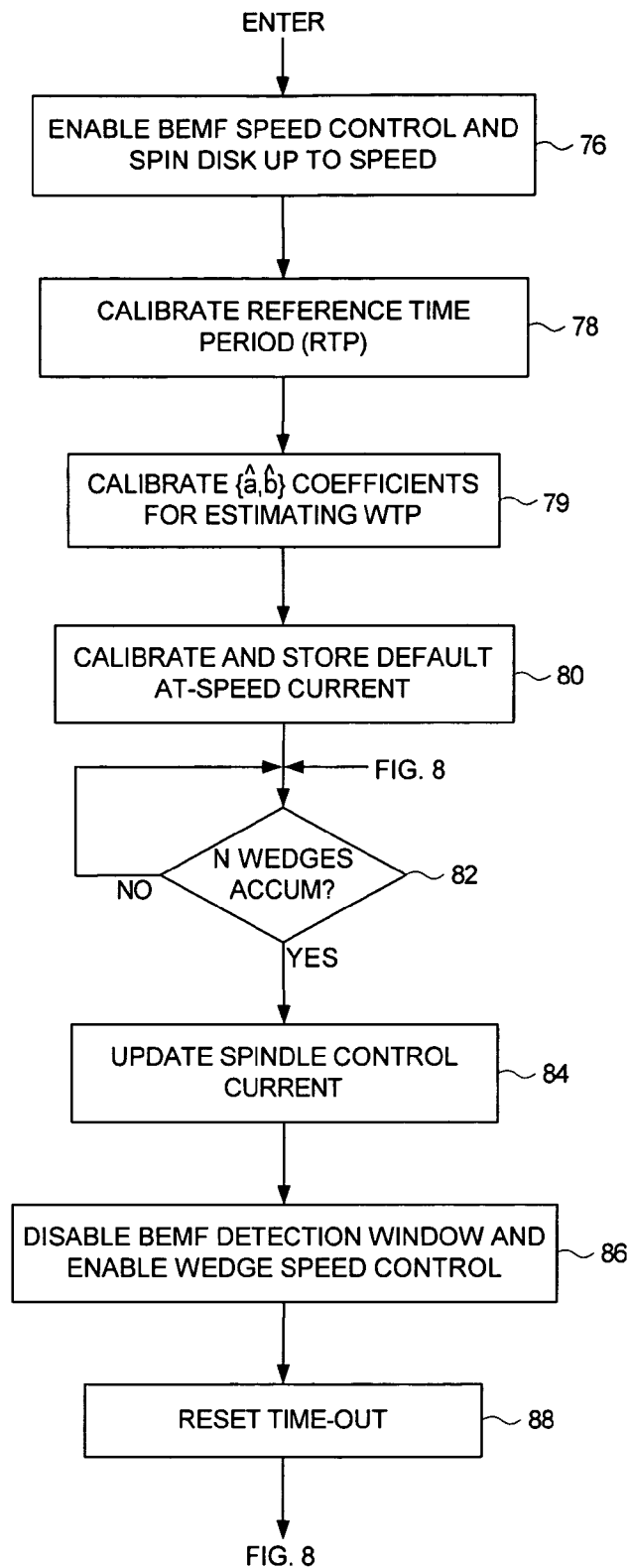
FIG. 7 is a flow diagram according to an embodiment of the present invention for spinning the disk up to the operating speed, calibrating a default at-speed current, and switching from the BEMF spindle speed control mode to wedge spindle speed control mode.

In one embodiment, a wedge time counter is incremented at a predetermined frequency. A predetermined number of wedge time counter values are accumulated representing a predetermined number of WTPs. This embodiment is illustrated in the flow diagram of FIGS. 7 and 8. At step 76 the BEMF detector 18 is enabled and the disk 4 is spun up to the operating speed by updating the spindle control current 14 in response to the BEMF speed error 58. Once the disk 4 is rotating at the operating speed (substantially zero BEMF speed error 58), a reference time period (RTP) is calibrated at step 78. In this embodiment, the RTP is generated by accumulating a predetermined number of wedge time counter values. That is, as each servo wedge 8 is detected, the wedge time counter value (adjusted by a corresponding eccentricity compensation value) is summed into the RTP (unless a servo wedge error is encountered as described below, in which case the wedge time counter value is ignored). In one embodiment, the wedge time counter is reset at each servo wedge 8, and in another embodiment, the wedge time counter is free running and the WTP is determined from the incremented wedge time counter value from wedge to wedge. At step 79 the coefficients $\{\hat{a},\hat{b}\}$ for generating the estimated WTPs are computed by executing the flow diagram of FIG. 2, and in one embodiment, over a number of different radial locations of the disk 4.

At step 80 a default at-speed current is calibrated which is the spindle control current 14 that generates a substantially zero BEMF speed error. The default at-speed current is used as the spindle control current 14 if an error condition is detected immediately after transitioning into the wedge speed control mode. Otherwise, the at-speed current is updated while the wedge speed error is substantially zero when controlling the spindle motor 12 in the wedge speed control mode.

While in the BEMF spindle speed control mode, the wedge time counter values (adjusted by corresponding eccentricity compensation values) are accumulated until at step 82 N wedge-to-wedge times have been accumulated into a wedge time period. If so, at step 84 the spindle control current 14 is updated in response to the wedge speed error computed by subtracting the wedge time period from the reference time period. At step 86 the BEMF detection window circuitry 59 is disabled, the wedge spindle speed control mode is enabled, and at step 88 a time-out counter for timing a time-out interval is reset. Any suitable time-out interval may be employed. In one embodiment, N wedge time counter values are accumulated to generate the wedge speed error, and the time-out interval is configured to M*N servo wedges 8 (where M is greater than 1 e.g., 1.5). That is, an error condition is detected if N wedge time counter values have not been accumulated within M*N servo wedges 8.

Figure 8:
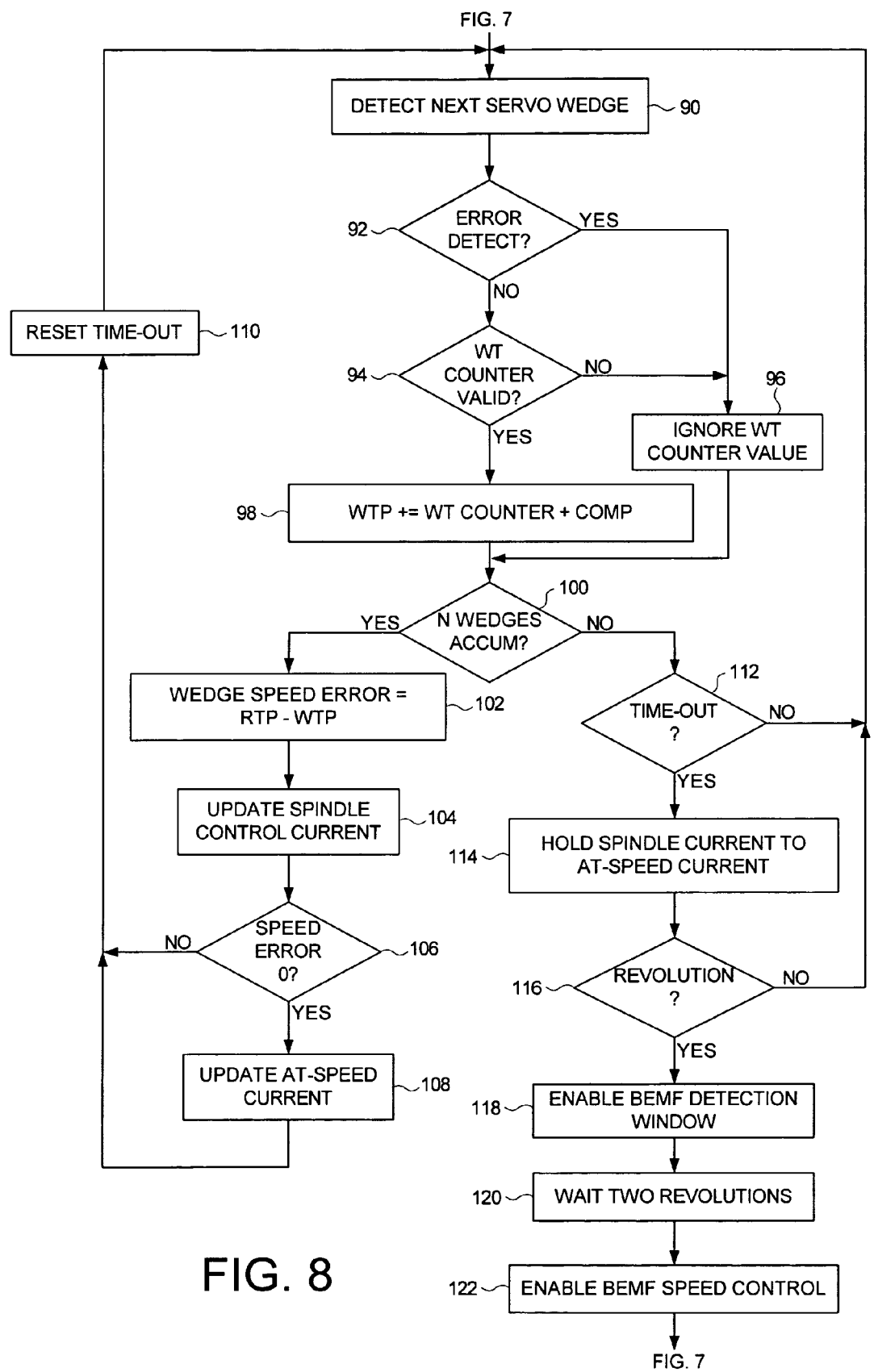
FIG. 8 is a flow diagram according to an embodiment of the present invention wherein a spindle control current is updated in response to a wedge speed error generated by accumulating a predetermined number of wedge time periods to generate a wedge time period and comparing the wedge time period to a reference time period.

Control then continues at step 90 of FIG. 8 wherein the next servo wedge 8 is detected. If a servo wedge error occurs, which may include an inability to synchronize to a servo wedge due to a burst error or detection of a bad track ID at step 92, or a bad wedge time counter value at step 94, then at step 96 the wedge time counter value is ignored. A bad wedge time counter value may be detected at step 94, for example, if a servo wedge is missed altogether. If a servo wedge error is not detected, then at step 98 the wedge counter value adjusted by an eccentricity compensation value is summed into the estimated WTP. The eccentricity compensation value is computed from the coefficients $\{\hat{a},\hat{b}\}$ for estimating the sinusoidal error in the WTP, and similar to the eccentricity compensation values 29 of FIG. 3B, in one embodiment the eccentricity compensation values are computed as a function of the current wedge number and track number. If at step 100 N wedge time counter values have been accumulated, then at step 102 the wedge speed error is computed by subtracting the WTP from the RTP. At step 104 the spindle control current 14 is updated in response to the wedge speed error. If at step 106 the wedge speed error is zero (or substantially zero), then at step 108 the at-speed current is updated with the spindle control current 14. Some form of averaging may be employed to filter noisy or erroneous spindle control current values. At step 110 the timer for timing the time-out interval is reset, and the process continues at step 90.

If at step 100 N wedge time counter values have not been accumulated and at step 112 the time-out interval expires, then an error condition is detected and at step 114 the spindle control current 14 is set to the at-speed current. Setting the spindle control current 14 to the at-speed current helps maintain the disk at the operating speed until the error condition subsides. If at step 116 a revolution of the disk 4 has not occurred without updating the spindle control current 14, then control branches back to step 90 to detect the next servo wedge. Because the time-out interval has not been reset, control will branch to step 112 and step 114 until N wedge time counter values have been accumulated at step 100. However, if at step 116 an entire revolution of the disk 4 has occurred before N wedge time counter values are accumulated, then the disk controller 22 transitions back into the BEMF spindle speed control mode. At step 118 the BEMF detection window circuitry 59 is enabled, and after waiting two revolutions of the disk 4 at step 120 to allow the BEMF speed error 58 to settle, the BEMF spindle speed control mode is enabled at step 122 and control branches to step 82 of FIG. 7. The disk controller 22 remains in the BEMF spindle speed control mode until again N wedge time counter values are accumulated at step 82 and the spindle control current 14 is updated at step 84.

In one embodiment, the disk controller 22 switches from the wedge spindle speed control mode to the BEMF spindle speed control mode without having detected an error. For example, during a calibration procedure the disk controller 22 may seek the head 10 to a calibration track where the timing between servo wedges 8 changes such that the reference time period is no longer valid. In addition, the disk controller 22 may switch from wedge spindle speed control to BEMF spindle speed control to perform certain test during manufacturing, such as resonance discover of the spindle motor 12. After disabling the wedge spindle speed control mode the disk controller 22 sets the spindle control current 14 to the at-speed current 74 for a predetermined interval (e.g., two revolutions of the disk) to allow the BEMF speed error 58 to settle. Once the BEMF speed error 58 settles, the disk controller 22 can transition safely into the BEMF spindle speed control mode.

Figure 9:
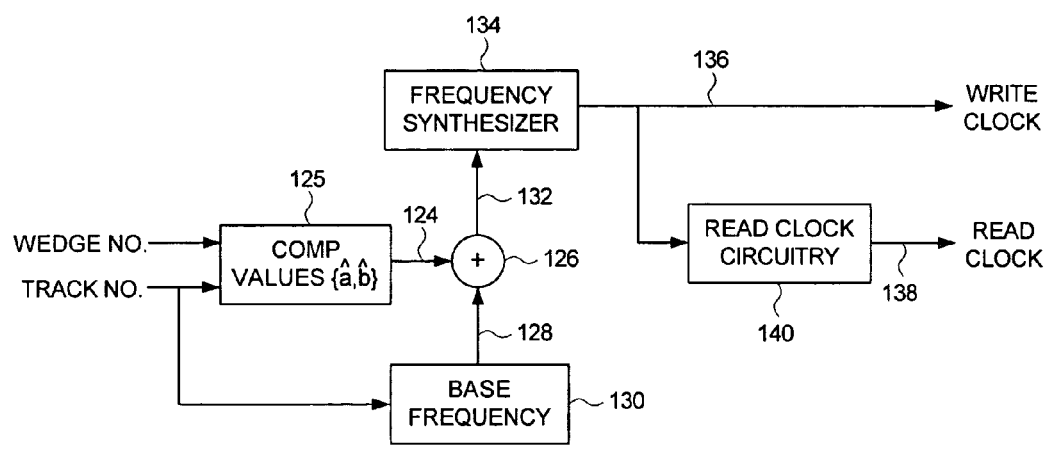
FIG. 9 shows an embodiment of the present invention wherein a frequency synthesizer is used to generate a write clock at a frequency that accounts for the eccentricity in the rotation of the disk to thereby maintain a substantially constant linear bit density.

FIG. 9 shows an embodiment of the present invention wherein coefficients $\{\hat{a},\hat{b}\}$ for estimating the sinusoidal error in the WTP are used to adjust the write frequency to achieve a substantially constant linear bit density. That is, the coefficients $\{\hat{a},\hat{b}\}$ are used to compensate for the sinusoidal speed variations due to the eccentricity in the disk rotating. An eccentricity compensation value 124 is computed 125 using coefficients {â,b̂} as a function of the current wedge number and track number. The eccentricity compensation value 124 is added 126 to a base frequency control signal 128 generated 130 as a function of the current track number (which corresponds to the current zone). The resulting compensated control signal 132 is applied to a frequency synthesizer 134 which generates a write clock 136 at a frequency that compensates for the sinusoidal speed variation as the disk rotates. During a read operation, a read clock 138 is generated by read clock circuitry 140 at a frequency that substantially matches the write clock 136 for the current wedge number and track number.

The read channel 40 of FIG. 1A may comprise any suitable modulation/demodulation circuitry for writing data to and reading data from the disk. In one embodiment, the read channel 40 comprises suitable partial-response/maximum-likelihood (PRML) circuitry, such as timing recovery circuitry, equalizing circuitry, and a Viterbi type sequence detector. During write operations, the write clock 136 clocks a preamp circuit to write data to the disk at a predetermined baud rate (write clock frequency). During a read operation, read signal samples values are generated synchronous to the baud rate and an estimated data sequence detected from the synchronous read signal sample values. The synchronous read signal sample values may be generated in any suitable manner, such as clocking a sampling device so as to sample the read signal synchronously (at a read clock frequency synchronized to the baud rate) or by sampling the read signal asynchronously and using an interpolation filter to generate synchronous read signal sample values. In addition, the eccentricity compensation values may be used to generate the synchronous sample values, for example, by generating an initial input frequency to a synchronous sampling phase locked loop (PLL), or by generating an asynchronous sampling clock for interpolated timing recovery. However, it may not be necessary to use the eccentricity compensation values to generate the synchronous sample values as long as the preamble is of sufficient length to lock the PLL when using synchronous sampling timing recovery, and as long as the interpolation filter has sufficient resolution and range when using interpolated timing recovery.

We claim:

1. A disk drive comprising:
   (a) a disk comprising a plurality of tracks, wherein:
       each track comprises a plurality of data sectors and a plurality of servo sectors forming N servo wedges; and
       a wedge time period (WTP) occurs between each servo wedge;
   (b) a head actuated over the disk; and
   (c) a disk controller for estimating a sinusoidal error in the WTP due to eccentricity in the disk rotating by:
       (i) positioning the head over a selected one of the tracks;
       (ii) calculating an estimated WTP according to:

$EST\_WTP = RTP + â*\cos(2\pi k/N) + b̂*\sin(2\pi k/N)$ wherein RTP is a reference time period corresponding to a nominal WTP, k is an index representing one of the servo wedges, and {â,b̂} are adjustable coefficients;
       (iii) detecting an actual WTP by detecting an interval between the head passing over a first and second servo wedge;
       (iv) estimating a wedge time error e(k) as the difference between the estimated WTP and the detected actual WTP;
       (v) adjusting the coefficients {â,b̂} for generating the estimated WTP according to:

$â(k+1) = â(k) - G*e(k)*\cos(2\pi k/N)$ $b̂(k+1) = b̂(k) - G*e(k)*\sin(2\pi k/N)$ wherein G is a predetermined gain; and
       (vi) repeating steps (ii)–(v) at least once.

2. The disk drive as recited in claim 1, wherein the disk controller repeats steps (ii)–(v) until the wedge time error e(k) falls below a predetermined threshold.

3. The disk drive as recited in claim 1, wherein:
   (a) each servo sector comprises a servo sync mark;
   (b) the disk controller controls a wedge period counter in response to the coefficients {â,b̂}; and
   (c) the disk controller opens a sync mark detection window in response to the wedge period counter indicating the head is approaching a servo sync mark in a servo sector.

4. A method of estimating a sinusoidal error in a wedge time period (WTP) in a disk drive due to eccentricity in a disk rotating, the disk drive comprising the disk having a plurality of tracks, wherein each track comprises a plurality of data sectors and a plurality of servo sectors forming N servo wedges, wherein the WTP occurs between each servo wedge, the disk drive further comprising a head actuated over the disk, the method comprising the steps of:
   (a) positioning the head over a selected one of the tracks;
   (b) calculating an estimated WTP according to:

$EST\_WTP = RTP + â*\cos(2\pi k/N) + b̂*\sin(2\pi k/N)$ wherein RTP is a reference time period corresponding to a nominal WTP, k is an index representing one of the servo wedges, and {â,b̂} are adjustable coefficients;
   (c) detecting an actual WTP by detecting an interval between the head passing over a first and second servo wedge;
   (d) estimating a wedge time error e(k) as the difference between the estimated WTP and the detected actual WTP;
   (e) adjusting the coefficients {â,b̂} for generating the estimated WTP according to:

$â(k+1) = â(k) - G*e(k)*\cos(2\pi k/N)$ $b̂(k+1) = b̂(k) - G*e(k)*\sin(2\pi k/N)$ wherein G is a predetermined gain; and
   (g) repeating steps (b)–(e) at least once.

5. The method as recited in claim 4, wherein steps (b)–(e) are repeated until the wedge time error e(k) falls below a predetermined threshold.

6. The method as recited in claim 4, wherein each servo sector comprises a servo sync mark, further comprising the steps of:
   (a) controlling a wedge period counter in response to the coefficients {â,b̂}; and
   (b) opening a sync mark detection window in response to the wedge period counter indicating the head is approaching a servo sync mark in a servo sector.

* * * * *